(12) United States Patent
Loew et al.

(10) Patent No.: US 10,773,653 B2
(45) Date of Patent: Sep. 15, 2020

(54) VEHICLE CARGO COVER ASSEMBLY HAVING HANGER

(71) Applicant: Ford Global Technologies, LLC, Dearborn, MI (US)

(72) Inventors: Pattrick Loew, Hastings, MI (US); Kendra White, Redford, MI (US); Scott Holmes Dunham, Redford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/166,551

(22) Filed: Oct. 22, 2018

(65) Prior Publication Data
US 2020/0122643 A1 Apr. 23, 2020

(51) Int. Cl.
*B60R 7/08* (2006.01)
*B60R 5/04* (2006.01)

(52) U.S. Cl.
CPC ............... *B60R 7/08* (2013.01); *B60R 5/047* (2013.01)

(58) Field of Classification Search
CPC ......... B60R 5/044; B60R 5/045; B60R 5/047; B60R 2011/0036; B60R 5/04; B60R 7/08; Y10S 224/925

USPC .......................................... 224/402–403, 925
See application file for complete search history.

(56) References Cited

U.S. PATENT DOCUMENTS

| 5,415,457 | A | 5/1995 | Kifer | |
|---|---|---|---|---|
| 5,685,592 | A * | 11/1997 | Heinz | B60N 3/10 224/925 |
| 6,349,986 | B1 * | 2/2002 | Seel | B60R 5/047 160/265 |
| 6,502,731 | B1 | 1/2003 | Gehring et al. | |
| 7,815,235 | B2 * | 10/2010 | Hayashi | B60R 5/047 160/DIG. 2 |
| 2002/0145024 | A1 * | 10/2002 | Schuster | B60R 7/02 224/543 |

FOREIGN PATENT DOCUMENTS

GB 2431905 A * 5/2007 ............. B60R 5/047

* cited by examiner

*Primary Examiner* — Scott T McNurlen
(74) *Attorney, Agent, or Firm* — David Coppiellie; Price Heneveld LLP

(57) ABSTRACT

A vehicle cargo area cover assembly is provided having a retractable cover roll mechanism, a cargo cover extending from the cover roll mechanism between retracted and extended positions, and a cover position member for maintaining the cover in a use position over a vehicle cargo area. The cover assembly further has a hanger coupled to the cover position member.

16 Claims, 5 Drawing Sheets

VEHICLE CARGO COVER ASSEMBLY HAVING HANGER

FIELD OF THE INVENTION

The present invention generally relates to vehicle cargo cover assemblies, and more particularly relates to a vehicle cargo cover assembly having a hanger for hanging one or more items such as a strap on a bag.

BACKGROUND OF THE INVENTION

Automotive vehicles are commonly equipped with extendable and retractable cargo area cover assemblies or shade assemblies for covering the rear cargo area of the vehicle. Passengers often place items on the floor of the vehicle within the cargo area, such as grocery bags, handbags, garment bags, purses, and other items that are often typically left unrestrained. Automotive vehicles are also commonly equipped with one or more garment hangers typically configured in the shape of a hook for hanging an item, such as a purse or a coat. The garment hangers are typically fixedly located at various locations on a trim panel near the headliner within the interior of the vehicle. It may be desirable to provide for enhanced hanger assemblies within the vehicle cargo area that allow for items, such as a purse or bag to be supported while transported within the cargo compartment of the vehicle.

SUMMARY OF THE INVENTION

According to one aspect of the present invention, a vehicle cargo area cover assembly is provided. The vehicle cargo area cover assembly includes a cover support structure, a cargo cover extending from the support structure, a cover position member for positioning the cargo cover over a vehicle cargo area, and a hanger coupled to the cover position member.

Embodiments of the first aspect of the invention can include any one or a combination of the following features:
- the hanger is provided on a hanger panel that is coupled to the cover position member;
- the hanger comprises one or more forward extending hooks formed in the hanger panel;
- the hanger comprises one or more sideways extending hooks formed in the hanger panel;
- the cover assembly includes a hanger cover configured to cover the hanger in a non-use position;
- the hanger cover is coupled to the cover position member and is engageable with the hanger panel in a covered position;
- the hanger rotates about the cover position member;
- the cargo cover comprises a shade material;
- the cover support structure comprises a retractable mechanism that retracts the cargo cover to a stowed position and allows for the cargo cover to be extended to a use position; and
- the cover assembly is located in a rear cargo area of a vehicle.

According to another aspect of the present invention, a vehicle cargo area cover assembly is provided. The vehicle cargo area cover assembly includes a retractable cover roll mechanism, a cargo cover extending from the cover roll mechanism between retracted and extended positions, a cover position member for maintaining the cover in a use position over a vehicle cargo area, and a hanger coupled to the cover position member.

Embodiments of the second aspect of the invention can include any one or a combination of the following features:
- the hanger is provided on a hanger panel that is coupled to the cover position member;
- the hanger comprises one or more forward extending hooks formed in the hanger panel;
- the hanger comprises one or more sideways extending hooks formed in the hanger panel;
- the cover assembly includes a hanger cover panel configured to cover the hanger in a non-use position;
- the hanger cover is coupled to the cover position member and is engageable with the hanger panel in a covered position;
- the hanger rotates about the cover position member;
- the cover comprises a shade material; and
- the assembly is located in a rear cargo area of a vehicle.

According to yet another aspect of the present invention, a vehicle cargo area cover assembly is provided. The vehicle cargo area cover assembly includes a retractable cover roll mechanism, a cargo cover extending from the cover roll mechanism between retracted and extended positions, and a hanger coupled to an outer end of the cargo cover.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
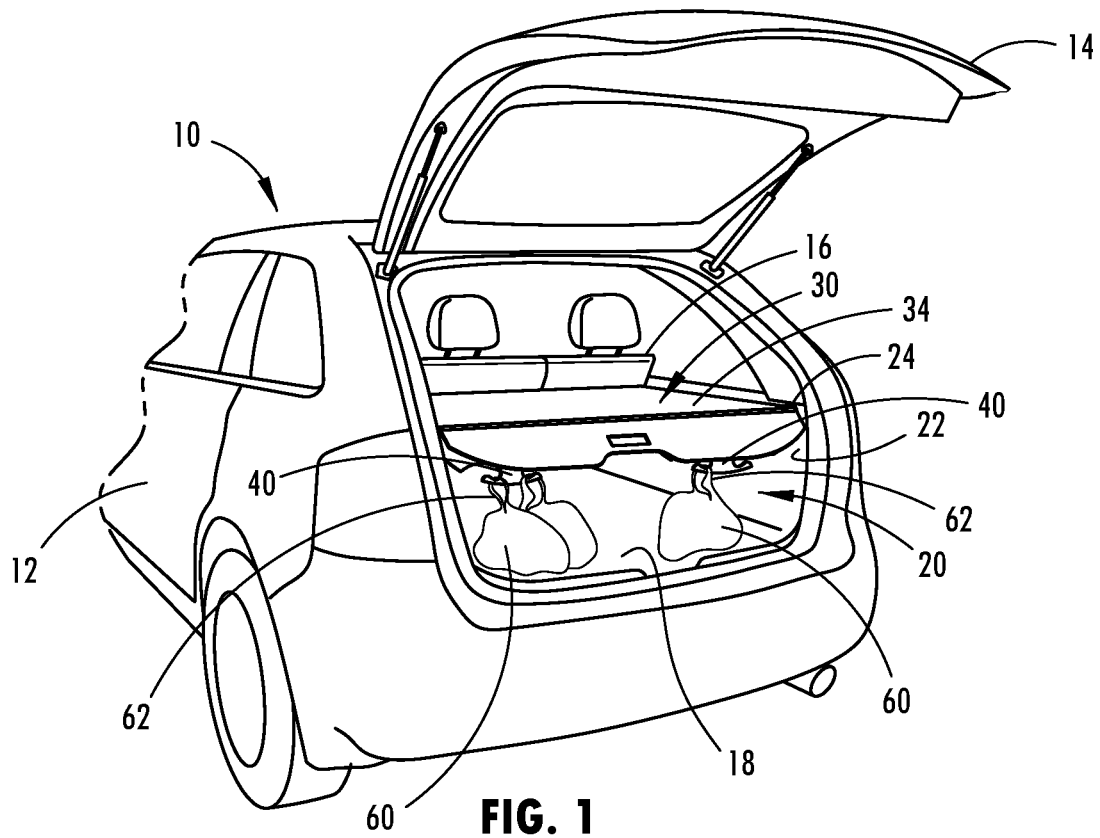
FIG. 1 is a rear perspective view of the rear portion of a vehicle having a cargo area cover assembly with hangers shown in a fully extended position covering the rear cargo compartment, according to a one embodiment.
Figure 2:
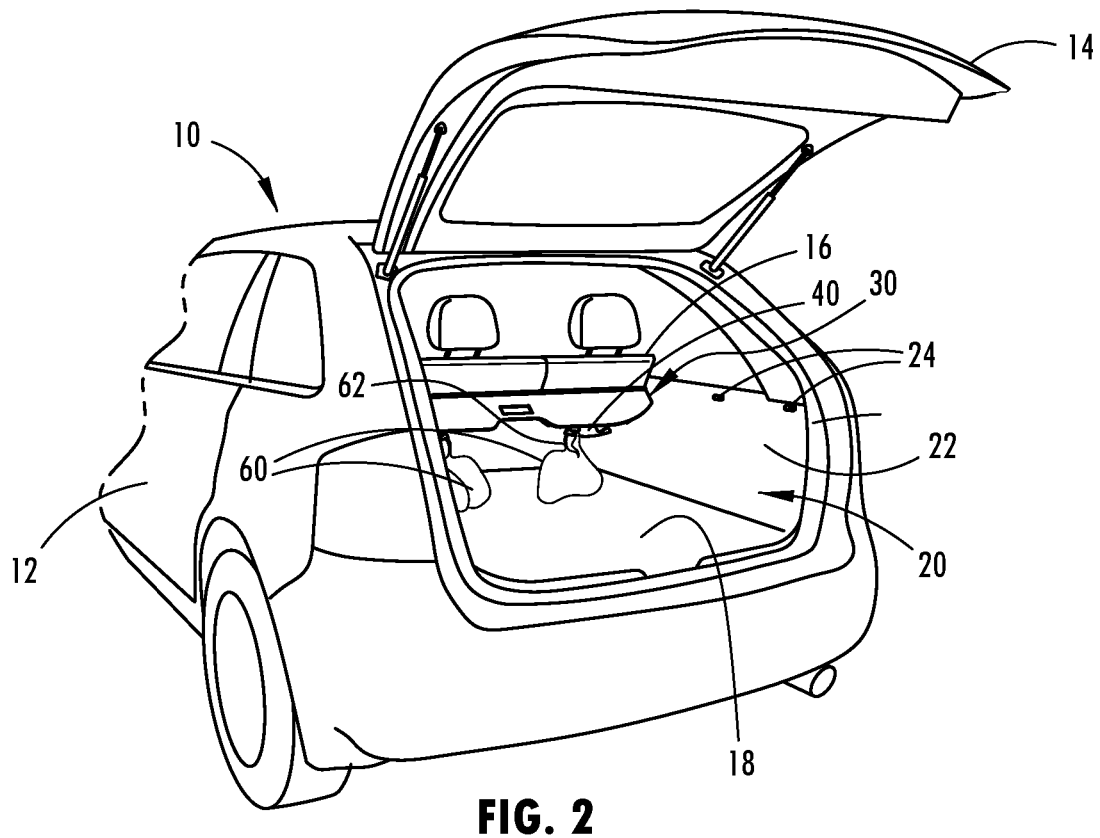
FIG. 2 is a perspective view of the rear portion of the vehicle with the cargo area cover assembly in a fully retracted position.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

Referring now to FIGS. 1 and 2, a vehicle 10 is generally illustrated having a rear passenger compartment cargo area 20 and a cargo area cover assembly 30 equipped with hangers, according to one embodiment. The vehicle 10 may be a wheeled motor vehicle such as a sport utility vehicle (SUV) or a hatchback-style vehicle generally having a rear cargo compartment or cargo area 20 that may be visible when not covered by the cargo area cover assembly 30, according to the embodiment shown. According to other embodiments, the vehicle 10 may be a passenger car, a van, a truck, a bus, or other vehicles that may be equipped with a cargo area cover assembly to cover a cargo area.

The vehicle 10 has a body 12 and a tailgate 14 or hatchback provided at the rear end of the vehicle 10. The body 12 generally defines the passenger compartment in the interior of the vehicle 10 and surrounds the cargo area 20 and other portions of the vehicle 10 such as the remainder of the passenger compartment and the engine compartment. The tailgate 14 is an entry or access door that pivots to an open position as shown to allow access to the rear cargo area 20 and to a closed position to prevent access from the rear end of the vehicle 10. The tailgate 14 is shown pivoting upwards about an upper rear end of the vehicle body 12, however, other access door configurations may be employed.

The vehicle 10 has vehicle seat assemblies shown generally located forward in the vehicle 10, such as front and rear rows of seats, with the rear cargo area located behind the rear row of seats 16. However, it should be appreciated that the cargo area 20 and cover assembly 30 may be located elsewhere within a vehicle 10, particularly for autonomous vehicles.

Figure 3A:
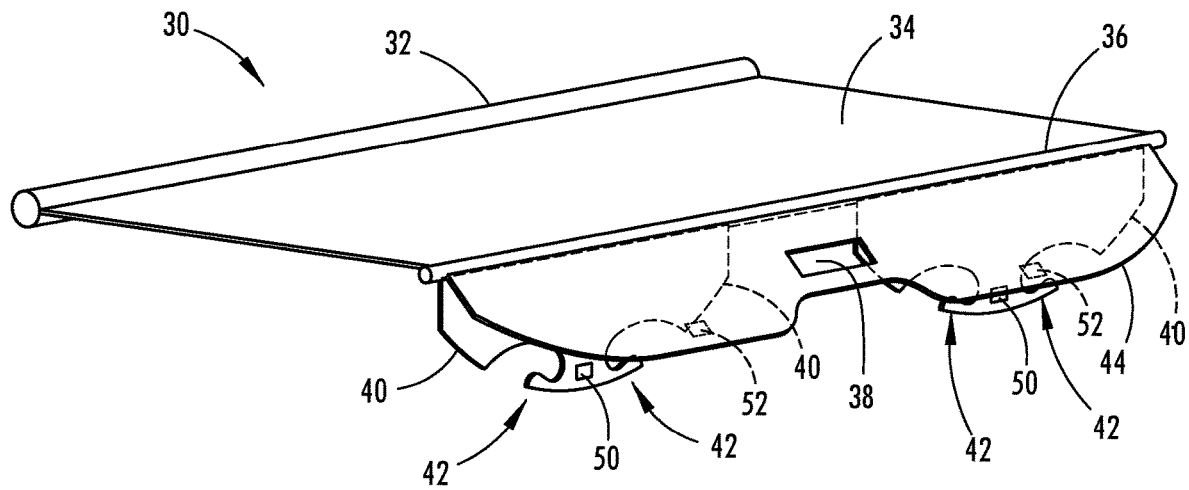
FIG. 3A is an enlarged perspective view of the cargo area cover assembly having hangers, according to a first embodiment.

The vehicle cargo area cover assembly 30 is generally shown supported on interior trim panels 22 on opposite left and right sides of the rear cargo area 20 generally rearward of the rear row of seats 16. The vehicle cargo area cover assembly 30 has a cargo cover 34 that extends from a cover support structure which in the embodiment shown is a retractable assembly in the form of a cover roll mechanism 32 (FIG. 3A). The cargo cover 20 may be retracted within the cover roll mechanism 32 as shown in FIG. 2 or extended to a covered position as shown in FIG. 1. When in the extended position shown in FIG. 1, the cargo cover 34 covers and shades the cargo area 20 below the cover 34 and covers items located on the cargo floor 18. In this position, the cargo cover 34 extends generally from the rear side of the rear row of seats 16 rearward towards the rear end of the cargo area of the vehicle 10 at an elevated height above the floor 18. The trim panels 22 on opposite lateral sides of the cargo area 20 each have one or more C-shaped receivers 24 for engaging a connector rod in the form of a cover position locking bar 36 on the cover assembly 30 to hold the cover assembly 30 in an extended cover position. In the embodiment shown, two C-shaped receivers 24 are illustrated on each lateral side of the trim panels 22 to allow the cargo cover 34 to be retained in a fully extended position as shown in FIG. 1 or a partially extended position forward of the fully extended position.

The cover assembly 30 is equipped with one or more hangers 40 that enable a user to hang one or more items 60, such as a grocery bag, a purse, or other items that have a strap or other supporting member and thereby support the item in the cargo area 20. As seen in FIGS. 1 and 2, items 60 are shown as bags having straps 62 supported on hangers 40 that extend downward from the vehicle cargo area cover assembly 30. The hangers 40 may support lightweight items that are hung and thereby on the hangers 40 supported above the floor 18 or may allow the items 60 such as heavier items to be supported on the bottom side thereof by the floor 18 and attached or held by the hangers 40 to prevent movement of the items 60 within the rear cargo area 20 as the vehicle 10 travels. This may enable a user and the vehicle 10 to more conveniently travel with items 60 such as grocery bags or luggage and retain the items in a retained position during travel.

Figure 3B:
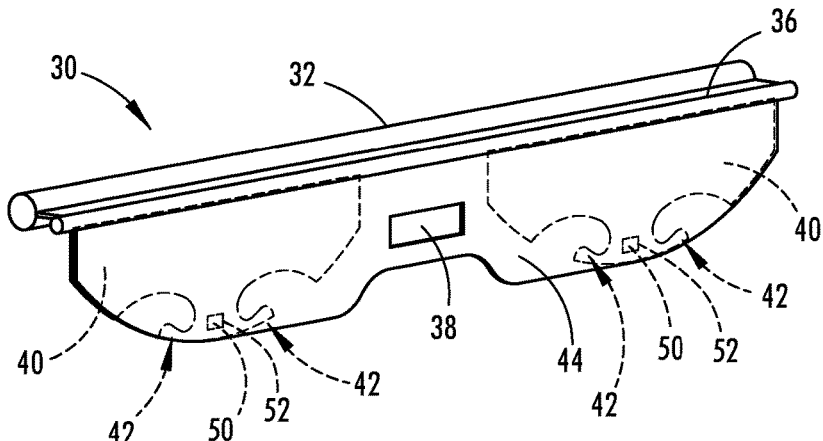
FIG. 3B is a rear perspective view of a portion of the cargo area cover assembly illustrated in FIG. 3A.
Figure 3C:
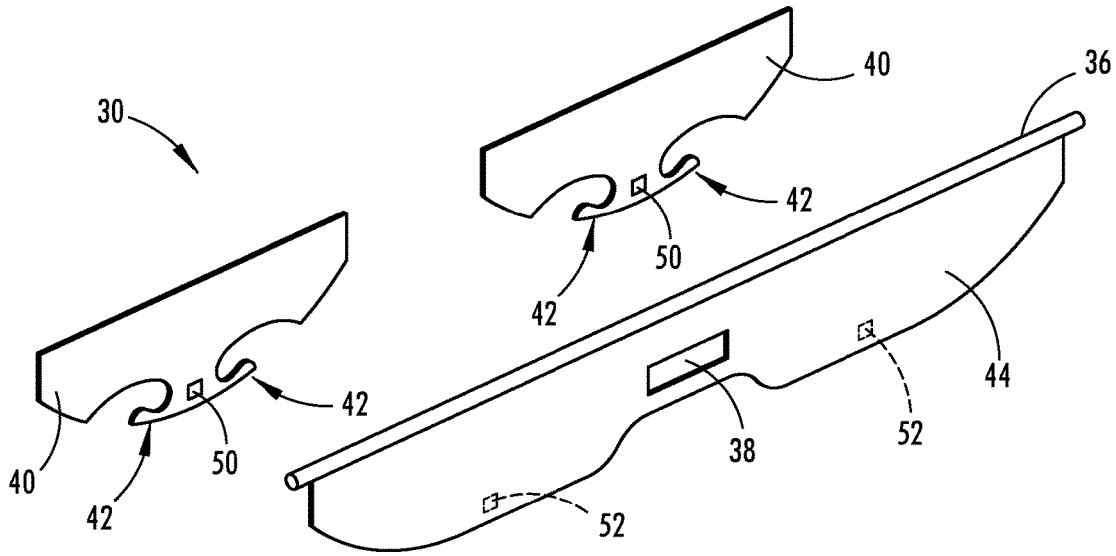
FIG. 3C is an exploded view of the portion of the cargo area cover assembly illustrated in FIG. 3B.

The cargo area cover assembly 30 is illustrated having a pair of hangers 40 extending downward from a cover position locking bar 36 of the vehicle cargo area cover assembly 30 as shown in FIGS. 3A-3C, according to a first embodiment. The cover assembly 30 includes a retractable and extendable cover roll mechanism 32 that may be spring loaded to retain and wind the cargo cover 34 to a biased retracted position within the coiled cover roll mechanism 32. As such, the cargo cover 34 may be wound up with a bias spring into the cover roll mechanism 32 when released from retention in an extended position. The cargo cover 34 has a cover position locking bar 36 at the outer end which enables the cargo cover 34 to be locked into position such as within a pair of C-shaped receivers 24 located on opposite sides of the interior trim panel 22. The cargo cover 34 extends between the cover roll mechanism 32 and the locking bar 36. The cover position locking bar 36 includes a cylindrical bar that fits within the C-shaped receivers on opposite ends to retain the cargo cover 34 in a selected extended position.

The hangers 40 are shown having first and second hangers extending downward from the cover position locking bar 36. The hangers 40 may pivot or rotate above the cover position locking bar 36 such that the hanger 40 extends downward when a weighted item is attached on the hanger. In the first embodiment, each hanger 40 is configured as a hanger panel having a pair of hooks 42 generally oriented in opposite directions facing outward within the plane of the hanger body member or traverse to the vehicle longitudinal axis. Each hook 42 may be formed as a proximate C-shaped or J-shaped cutout within the hanger 40. The two hooks 42 are oriented in opposite directions facing outward, but may otherwise be oriented facing inwards and may have differing shapes configured to engage and hang an item. As such, each hanger 40 provides two hooks 42 for receiving and retaining items for transportation such as a strap on a bag or other item. While two hangers 40 are illustrated extending from the cover position locking bar 36, it should be appreciated that any number of one or more hangers may be employed. Additionally, each hanger 40 may have one or more hooks 42 provided therein.

Figure 5:
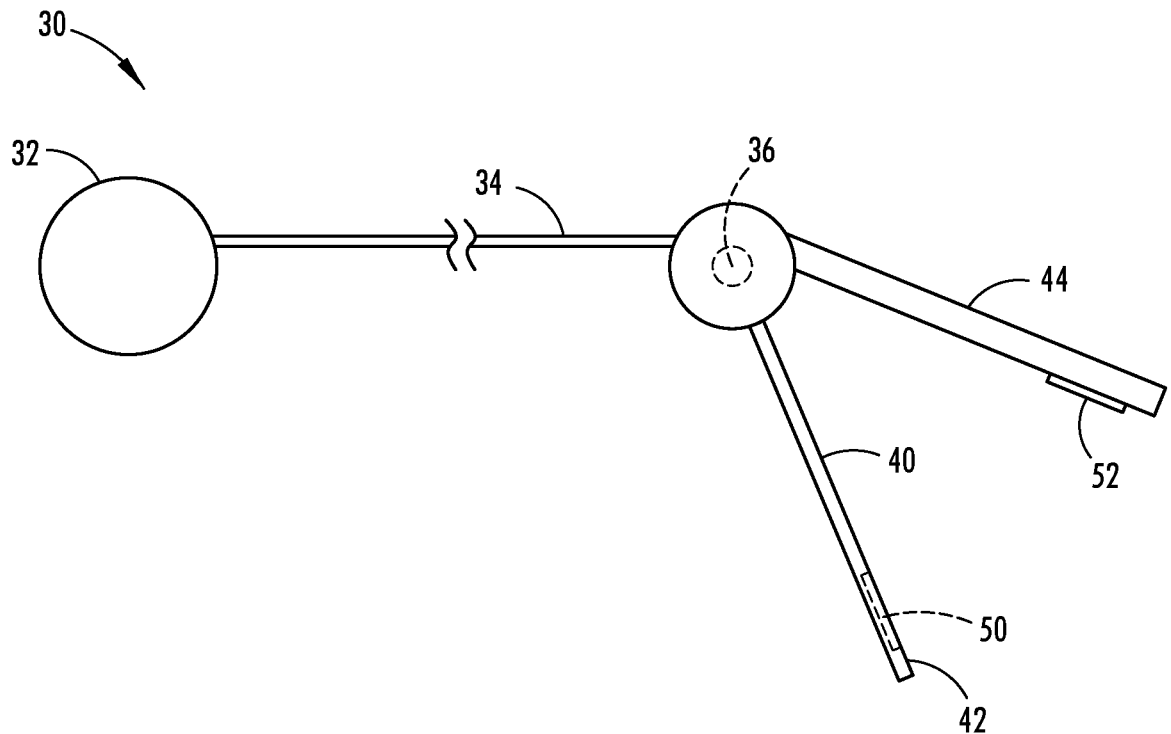
FIG. 5 is a side view of the cargo area cover assembly illustrated in FIGS. 3A-3C in the extended position.

The vehicle cargo area cover assembly 30 further includes a hanger cover 44 shown as a planar member connected to the cover position locking bar 36 rearward in the vehicle 10. The hanger cover 44 has a surface area sufficient to cover the hangers 40 or at least the hooks 42 such that the hangers 40 or hooks 42 may be concealed by the hanger cover 44 when not in use. When the hangers 40 are to be used, the hanger cover 44 may be pivoted or rotated rearward and upward to expose the hangers 40 as seen in FIGS. 3A and 5. As further seen in FIG. 5, the hanger cover 44 may include an outward protruding portion 52 that abuts and connects into a recess 50 formed in the surface of the hanger 40. As such, the outward protruding member 52 may snap-fit into recess 50 to hold the hanger cover 44 onto the hanger 40 with friction to prevent movement therebetween. The hanger cover 44 further includes a handle 38 located centrally therein to enable a user to pull the cargo cover 34 towards the extended position.

The cargo cover 34 may include a shade material to shade the cargo area 20 from sunshine, according to one embodiment. The cargo cover 34 may be vinyl, fabric or other cover or shading material. The cover 34 is shown as a flexible material that rolls onto a roll, however, other extendable and retractable covers may be used with the cover assembly 30 having one or more hangers 40.

Figure 4A:
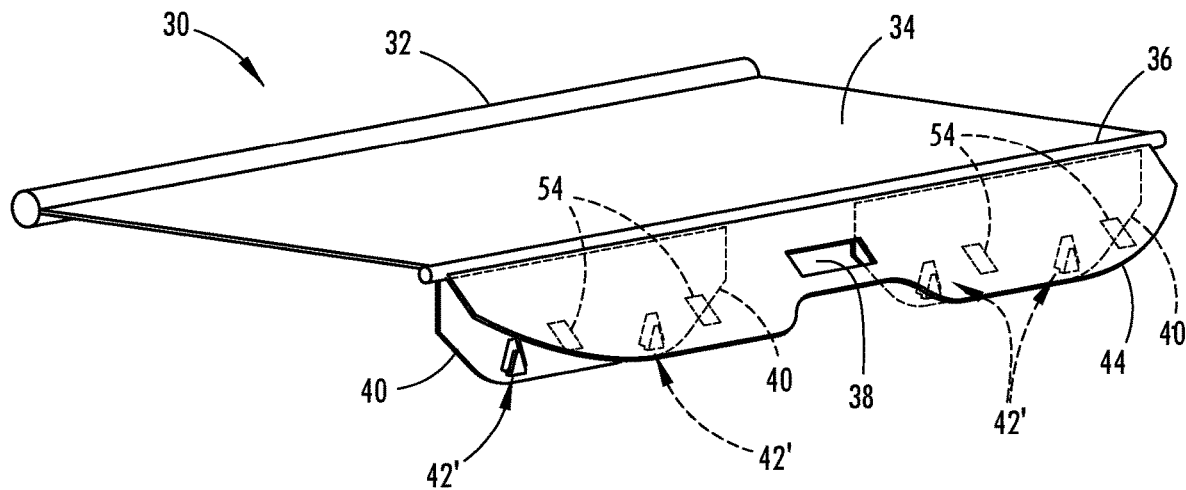
FIG. 4A is a perspective view of the cargo area cover assembly having hangers, according to a second embodiment.
Figure 4B:
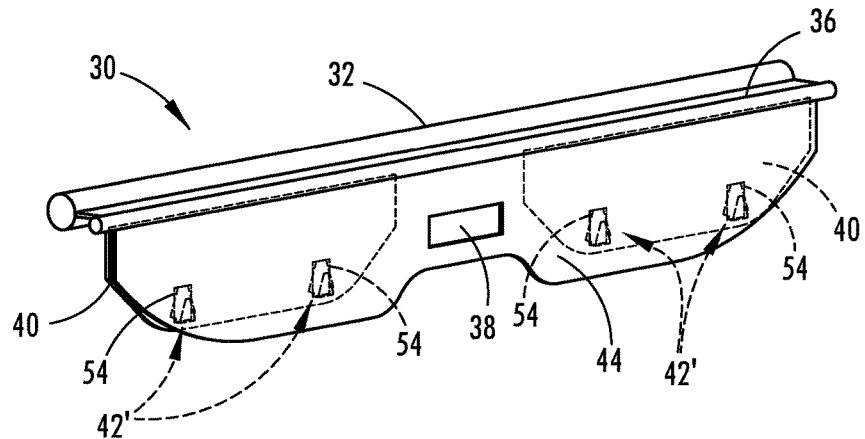
FIG. 4B is a rear view of a portion of the cargo area cover assembly illustrated in FIG. 4A.
Figure 4C:
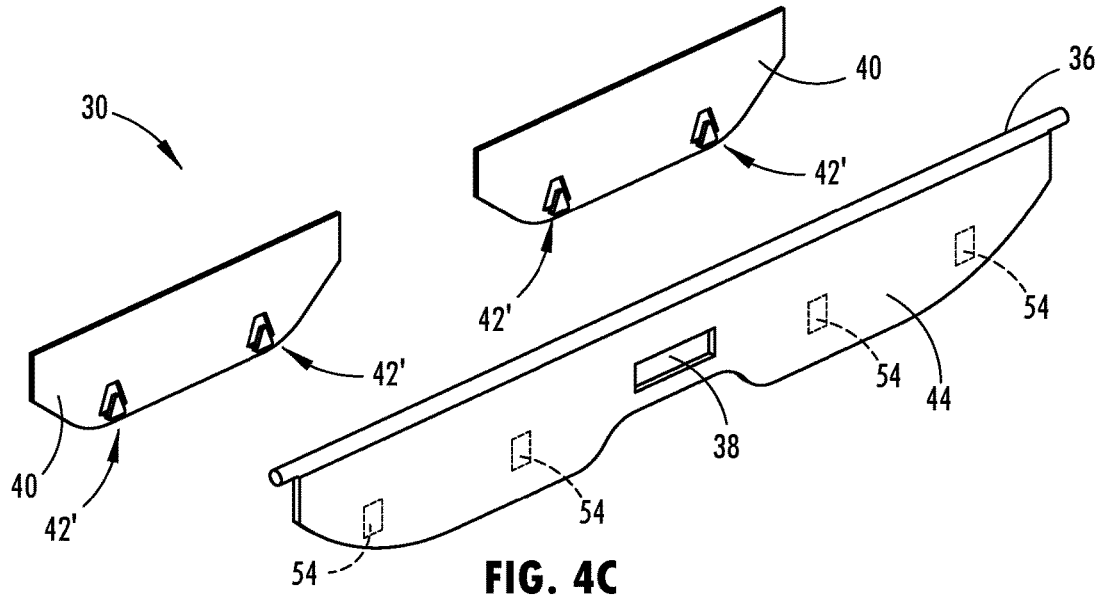
FIG. 4C is an exploded view of the portion of the cargo area cover assembly illustrated in FIG. 4B.

Referring to FIGS. 4A-4C, a vehicle cargo area cover assembly 30 is illustrated having one or more hangers 40 with rearward projecting hooks 42', according to a second embodiment. In this embodiment, the vehicle cargo area cover assembly 30 likewise includes a cover roll mechanism 32, a cargo cover 34 and cover position locking bar 36 configured to retract and extend the cargo cover 34 between stowed and cover positions as described above in connection with the first embodiment. However, in this embodiment, the hanger 40 which is suspended from the cover position locking bar 36, has a pair of hooks 42' that are approximately J-shaped extending rearward in the longitudinal axis of the vehicle 10 to enable an item, such as a bag with a strap, to be hung thereon. The hanger 40 may include one or more hooks 42' and one or more hangers 40 may be employed on the cover assembly 30.

Figure 6:
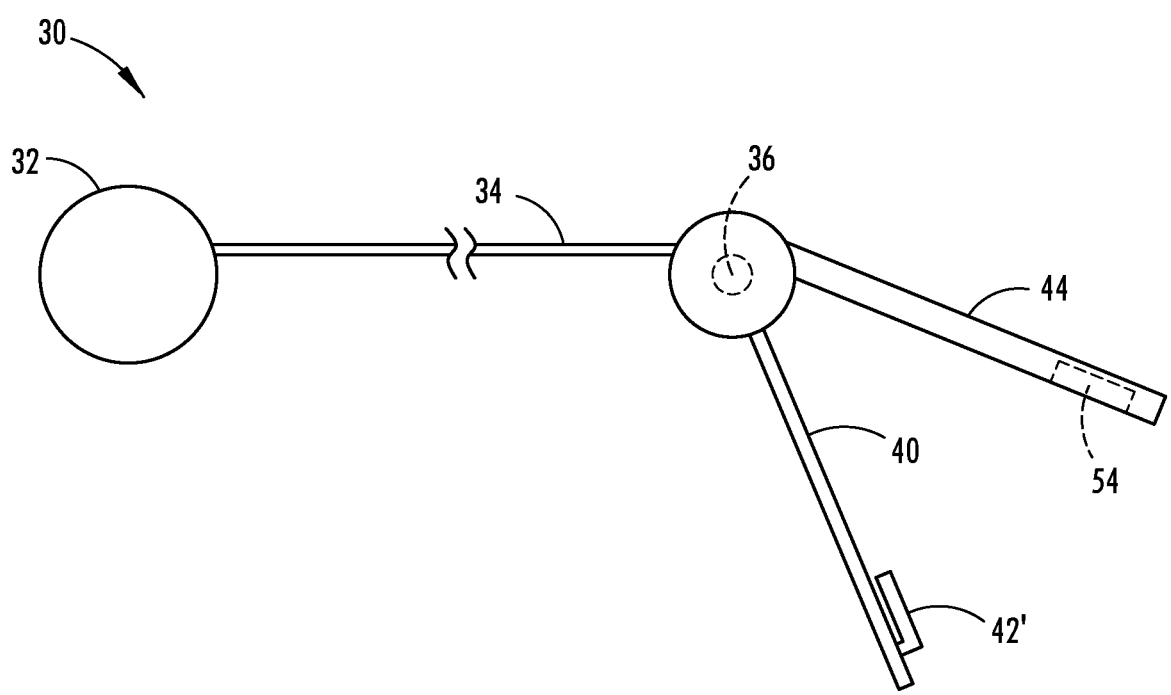
FIG. 6 is a side view of the cargo area cover assembly illustrated in FIGS. 4A-4C in the extended position.

As seen in FIG. 6, the hanger cover 44 has a recess 54 provided therein and configured to matingly engage the hooks 42' on hanger 40 when the hanger cover 44 is snap-fit onto the hanger 40. As such, the hanger 40 and hooks 42' are concealed by the hinge cover 44 when the hooks 42' are not in use.

Figure 7:
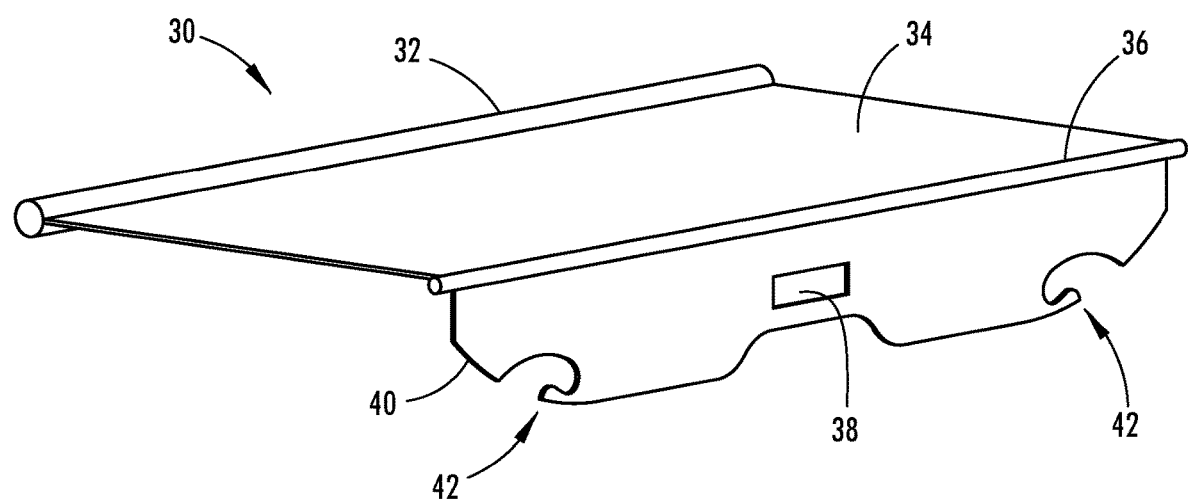
FIG. 7 is a perspective view of the cargo area cover assembly having a hanger, according to a third embodiment.

Referring to FIG. 7, a vehicle cargo area cover assembly 30 is illustrated having a single hanger 40 with a pair of hooks 42, according to a third embodiment. In this embodiment, the vehicle cargo area cover assembly 30 likewise includes a cover roll mechanism 32, a cargo cover 34 and cover position locking bar 36 configured to retract and extend the cargo cover 34 between stowed and cover positions as described above in connection with the first and second embodiments. However, in this embodiment, a single hanger 40 is suspended from the cover position locking bar 36. The single hanger 40 has a pair of hooks 42 at opposite ends that extend transverse to the longitudinal axis of the vehicle to enable an item, such as a bag with a strap to be hung thereon. The single hanger 40 may include one or more hooks 42 and other hook arrangements may be employed. Additionally, the pull handle 38 may be incorporated into the single hanger 40. The vehicle cargo area cover assembly 30 shown in FIG. 7 may or may not include a hanger cover such as hanger cover 44 shown and described in connection with the other embodiments.

When a user desires to store one or more items 60 on the hanger 40 of the vehicle cargo area cover assembly 30, a user may grab the handle 38 from the rear end of the vehicle with the tailgate open and extend with a pull force the cargo cover 34 to a fully or partial extended use or cover position engaged in a pair of receivers 24 and may rotate the hanger cover 44 to an upright position to expose the hanger 40 and hooks 42. The user may then place one or more item 60 such as a bag having a strap onto one or more of the hooks 42 or 42' of hanger 40 to help retain the items during travel. The items 60 may be partially or fully supported by the vehicle floor 18 or may be partially or fully supported by the hanger 40. It should be appreciated that the hanger 40 may also be used when the cargo cover 34 is in a partially extended position or in a fully retracted position in which case the hanger 40 would be located more vehicle forward within the cargo area 20.

Accordingly, a vehicle cargo area cover assembly 30 is provided that advantageously provides for one or more hangers 40 to help support one or more items 60 such as grocery bags within the cargo area 20 of the vehicle 10. The cargo cover assembly 30 allows for items 60 to be supported thereon on the hanger 40 when the cargo cover assembly 30 is in the fully extended, partially retracted or fully retracted positions. A user may easily use the cover assembly 30 to transport items 60 within the vehicle 10 and provide added retention or restraint during travel of the vehicle 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle cargo area cover assembly comprising:
   a cover support structure;
   a cargo cover extending from the support structure;
   a cover position member for positioning the cargo cover over a vehicle cargo area;
   a hanger panel coupled to the cover position member;
   a hanger comprising one or more hooks provided on the hanger panel at a lower end of the hanger panel; and
   a hanger cover that is movable relative to the hanger panel, wherein the hanger cover is retained to the hanger panel to cover the hanger such that the hanger is concealed from view by the hanger cover in a non-use covered position and is movable away from the hanger panel to expose the hanger in a use position.

2. The cover assembly of claim 1, wherein the one or more hooks comprises one or more rearward extending hooks formed in the hanger panel.

3. The cover assembly of claim 1, wherein the one or more hooks comprises one or more sideways extending hooks formed in the hanger panel.

4. The cover assembly of claim 1, wherein the hanger cover is coupled to the cover position member and is pivotably engageable with the hanger panel in the non-use covered position.

5. The cover assembly of claim 1, wherein the hanger rotates about the cover position member.

6. The cover assembly of claim 1, wherein the cargo cover comprises a shade material.

7. The cover assembly of claim 1, wherein the cover support structure comprises a retractable mechanism that retracts the cargo cover to a stowed position and allows for the cargo cover to be extended to a use position.

8. The cover assembly of claim 1, wherein the assembly is located in a rear cargo area of a vehicle.

9. A vehicle cargo area cover assembly comprising:
   a retractable cover roll mechanism;
   a cargo cover extending from the cover roll mechanism between retracted and extended positions;
   a cover position member for maintaining the cover in a use position over a vehicle cargo area;
   a hanger panel coupled to the cover position member;
   a hanger comprising one or more hooks provided on the hanger panel at a lower end of the hanger panel; and
   a hanger cover that is movable relative to the hanger panel, wherein the hanger cover is retained to the hanger panel to cover the hanger such that the hanger is concealed from view by the hanger cover in a non-use covered position and is movable away from the hanger panel to expose the hanger in a use position.

10. The assembly of claim 9, wherein the one or more hooks comprises one or more rearward extending hooks formed in the hanger panel.

11. The assembly of claim 9, wherein the one or more hooks comprises one or more sideways extending hooks formed in the hanger panel.

12. The assembly of claim 9, wherein the hanger cover is coupled to the cover position member and is pivotably engageable with the hanger panel in the non-use covered position.

13. The assembly of claim 9, wherein the hanger rotates about the cover position member.

14. The assembly of claim 9, wherein the cover comprises a shade material.

15. The assembly of claim 9, wherein the assembly is located in a rear cargo area of a vehicle.

16. A vehicle cargo area cover assembly comprising:
   a retractable cover roll mechanism;
   a cargo cover extending from the cover roll mechanism between retracted and extended positions;
   a cover position member for positioning the cargo cover over a cargo area;
   a hanger panel coupled to the cover position member;
   a hanger comprising one or more hooks provided on the hanger panel at a lower end of the hanger panel; and
   a hanger cover that is movable relative to the hanger panel, wherein the hanger cover is retained to the hanger panel to cover the hanger such that the hanger is concealed from view by the hanger cover in a non-use covered position and is movable away from the hanger panel to expose the hanger in a use position.

* * * * *